United States Patent [19]

Burke

[11] Patent Number: 5,670,047
[45] Date of Patent: Sep. 23, 1997

[54] ANAEROBIC TREATMENT PROCESS FOR THE RAPID HYDROLYSIS AND CONVERSION OF ORGANIC MATERIALS TO SOLUBLE AND GASEOUS COMPONENTS

[76] Inventor: Dennis A. Burke, 6007 Hill Rd. N.E., Olympia, Wash. 98516

[21] Appl. No.: 632,022

[22] Filed: Apr. 15, 1996

[51] Int. Cl.$^6$ .................................................. C02F 3/28
[52] U.S. Cl. .................. 210/603; 210/613; 210/614; 210/615; 210/617; 210/631
[58] Field of Search ........................ 210/603, 612, 210/613, 614, 615, 616, 617, 631

[56] References Cited

U.S. PATENT DOCUMENTS

| | | |
|---|---|---|
| 2,777,815 | 1/1957 | Forrest . |
| 2,786,025 | 3/1957 | Lamb et al. . |
| 3,847,803 | 11/1974 | Fisk .................... 210/612 |
| 4,053,394 | 10/1977 | Fisk .................... 210/612 |
| 4,318,993 | 3/1982 | Ghosh et al. .......... 210/603 |
| 4,375,412 | 3/1983 | Schimel . |
| 4,551,250 | 11/1985 | Morper et al. . |
| 4,559,142 | 12/1985 | Morper . |
| 4,597,872 | 7/1986 | Andersson et al. ..... 210/603 |
| 4,652,374 | 3/1987 | Cohen ................... 210/603 |
| 4,659,471 | 4/1987 | Molin et al. .......... 210/603 |
| 5,015,384 | 5/1991 | Burke . |
| 5,431,819 | 7/1995 | Hack et al. ............ 210/603 |
| 5,525,228 | 6/1996 | Dague et al. .......... 210/603 |
| 5,529,692 | 6/1996 | Kubler ................. 210/603 |

OTHER PUBLICATIONS

Riffat, Rumana and Dague, Richard R.; "Laboratory studies on the anaerobic biosorption process;" *Water Environment Research*, 67(7):1104–1110; Nov./Dec. 1995.

*Primary Examiner*—Neil McCarthy
*Assistant Examiner*—Theodore M. Green
*Attorney, Agent, or Firm*—Christensen O'Connor Johnson & Kindness PLLC

[57] ABSTRACT

An anaerobic digestion process capable of converting organic slurries to precipitates, as well as soluble and gaseous products through a series of reactors or process steps. The organic material is processed through three sequential steps consisting of two anaerobic digestion steps and an intermediate liquid/solid separation step. The sequential steps consist of first degrading rapidly metabolized soluble and particulate constituents, contained in the influent, by mixing the influent to the first reactor with an effluent from a second reactor containing a high concentration of active biomass. Effluent from the first reactor is treated in a second step wherein the soluble and particulate components are mechanically separated from an effluent stream essentially free of particulate material but containing soluble products of digestion. The particulate stream is transferred to the second anaerobic reactor wherein the solely degrading materials are converted to soluble and gaseous products of digestion as well as precipitates.

13 Claims, 2 Drawing Sheets

Anaerobic Treatment Process

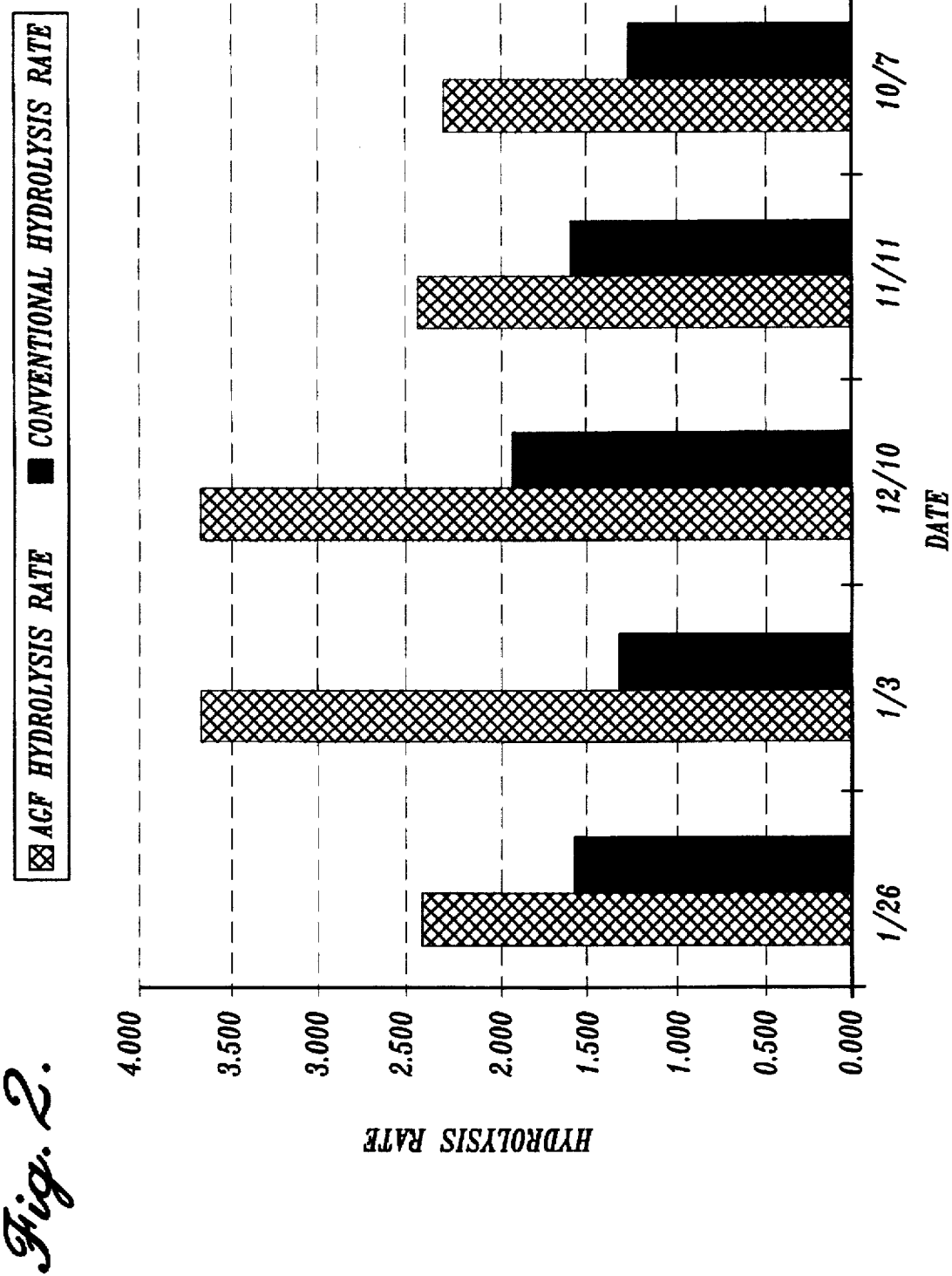

5,670,047

ANAEROBIC TREATMENT PROCESS FOR THE RAPID HYDROLYSIS AND CONVERSION OF ORGANIC MATERIALS TO SOLUBLE AND GASEOUS COMPONENTS

FIELD OF THE INVENTION

The present invention relates to an anaerobic treatment process to convert organic materials to soluble and gaseous components.

BACKGROUND OF THE INVENTION

Anaerobic digestion is widely used industrially and municipally to convert organic materials to soluble and gaseous products. Typically, organic materials from industrial and municipal sources include soluble, colloidal and particulate constituents that have different hydrolysis rates. Some of the constituents of the organic materials will metabolize and be degraded more rapidly than other constituents. For example, acetic acid, as contained in condensates of sulfite pulping plants or glucose, as contained in sugar waste waters, are constituents that degrade rapidly. On the other hand, constituents that do not degrade so rapidly include particulate and colloidal materials, such as proteins, long chain fatty acids, fats, vegetable oils, tallow, bacterial and yeast cell walls, and celluloses.

The economic use of anaerobic digestion requires that a diverse symbiotic bacterial mass be maintained in contact with the organic material while promoting the hydrolysis of the particulate constituents and slowly metabolized materials. Consequently, a wide variety of anaerobic reactor designs have been developed that maintain biomass within a reactor. These reactor designs are characterized broadly as fixed film processes, anaerobic filters, sludge blanket reactors, carrier-assisted fluidized bed reactors, and anaerobic contact reactors. All of these processes provide the benefit of maintaining a large bacterial population within a reactor and thus reducing the size of the reactor. Nonetheless, when treating a stream of organic materials as described above containing rapidly hydrolyzed and degradable constituents and less rapidly hydrolyzed and degradable constituents, the hydrolysis of the less rapidly hydrolyzed constituents proceeds slowly compared to the other constituents. Accordingly, the hydrolysis of the less rapidly hydrolyzed constituents becomes the rate limiting step in the overall process since complete degradation can take place only after hydrolysis of all the nonsoluble constituents has occurred. In prior reactor designs achieving hydrolysis of all non-soluble constituents required large tank volumes, to accommodate for the entire substrate flow, regardless of concentration or varying substrate hydrolysis rates of the constituents.

Several previous investigators have noted this shortcoming and have addressed it in a number of different ways. For example, U.S. Pat. No. 4,559,142 to Morper and U.S. Pat. No. 4,551,250 to Morper et al. recognize that it is economically advantageous to process the more slowly hydrolyzable material in a reactor, separate from a reactor where the more rapidly hydrolyzed material is treated.

The rate of hydrolysis has typically been depicted as an innate quality of the substrate to be degraded. Prior investigators have modeled particulate hydrolysis as a first order reaction, independent of the concentration of bacteria. This basic approach to the rate of hydrolysis has limited many previous efforts to reduce the size of anaerobic reactors and thus improve the economic factors involved in the treatment process because again the reactors were sized to accommodate the entire substrate flow of less rapidly and more rapidly hydrolyzed constituents.

SUMMARY OF THE INVENTION

The present invention is an anaerobic process for converting organic slurries or waste materials, to precipitates, as well as soluble and gaseous products through a series of reactors or process steps. The organic influent that may be treated in accordance with the present invention is expected to be a mixed substrate including organic constituents that can be rapidly assimilated by anaerobic bacteria as well as organic constituents that are more slowly degraded or more slowly metabolized by the bacteria. These two types of constituents can generally be classified as being either soluble, colloidal, or particulate components.

The present invention in part is based upon applicant's observation that the rate of hydrolysis of various organic components is not solely a characteristic of the substrate itself, but is also dependent upon the concentration of the anaerobic bacteria, with their associated hydrolytic enzymes, and other environmental conditions including the concentration of the end products produced. As noted in the Background, in the past, the rate of hydrolysis was considered to be an innate quality of the substrate itself. Accordingly, particulate hydrolysis in the past has been modeled as a first order reaction, independent of the concentration of the bacteria. The present applicant has observed that the rate of substrate hydrolysis is a function of the contact rate, nature of the substrate, the bacterial population responsible for hydrolyzing the substrate, as well as end product concentration.

Applicant has devised a process comprising three sequential steps consisting of two anaerobic digestion steps and one liquid/solid separation step. The process involves the steps of first mixing an influent stream containing the organic material with first anaerobic bacteria from an anaerobic reactor. The organic material is maintained in contact with the anaerobic bacteria for a predetermined period to allow for the partial digestion of the organic material. The more rapidly hydrolyzed and metabolized constituents will tend to be the constituents that are digested in this first anaerobic reactor. The suspended colloidal constituents and particulate constituents, including bacteria and enzymes, are then separated mechanically (e.g., by flotation) or chemically from the partially digested influent stream. The separated suspended colloidal constituents and particulate constituents, including bacteria and enzymes, are then delivered to the second anaerobic reactor which preferably served as the source of anaerobic bacteria for the first reactor for further contact with the anaerobic bacteria. In this second anaerobic reactor, the more slowly hydrolyzed and degraded are maintained for a sufficient period of time with concentrated biomass to achieve the desired digestion. Because the volume of the suspended colloidal constituents and particulate constituents that are separated from the partially digested influent stream is less than the volume of the influent stream, the size requirements of the second anaerobic digester are reduced.

In a preferred embodiment, the first anaerobic reactor reduces the soluble constituents, or those constituents that cannot be removed by the separation device described above, to a level that meets the process effluent limitations and to remove particulate and colloidal constituents, or those constituents that can be removed by the separation device, to a level that benefits the separation device economics and the economics of the second anaerobic reactor. Thus, there are two goals to be met by the first reactor:

(1) Meet effluent limitations by removing those constituents that cannot be removed by the separator; and (2) Remove as much of the particular and colloidal constituents as economically feasible to improve the economics of the separation process and the capacity of the second anaerobic digester.

In another aspect, the present invention relates to the removal of soluble products of digestion by elutriation of the anaerobic bacteria with the dilute influent stream or with dilution water. The advantage of elutriating these soluble products of digestion from the anaerobic bacteria is that it removes components that would otherwise inhibit the bacteria's desirable activity.

The process may be operated at both mesophilic or thermophilic temperatures. Use of a floation separation device will enhance organic acid removal through a gas bubble attachment if a thermophilic reactor temperature is maintained. For certain substrate materials, the process may be enhanced by maintaining the second reactor at a higher temperature to increase the hydrolysis of a particular substrate. Synthetic carriers for bacteria or fixed films within the first reactor may also be used to enhance removal of soluble constituents.

Processes carried out in accordance with the present invention take advantage of the natural anaerobic digestion mechanisms to produce a clean effluent while minimizing the capital and operating cost of anaerobic treatment facilities through reduction in reactor volume and total process retention times.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a graph of hydrolysis rates.

DETAILED DESCRIPTION OF THE PREFERRED EMBODIMENT

Figure 1:
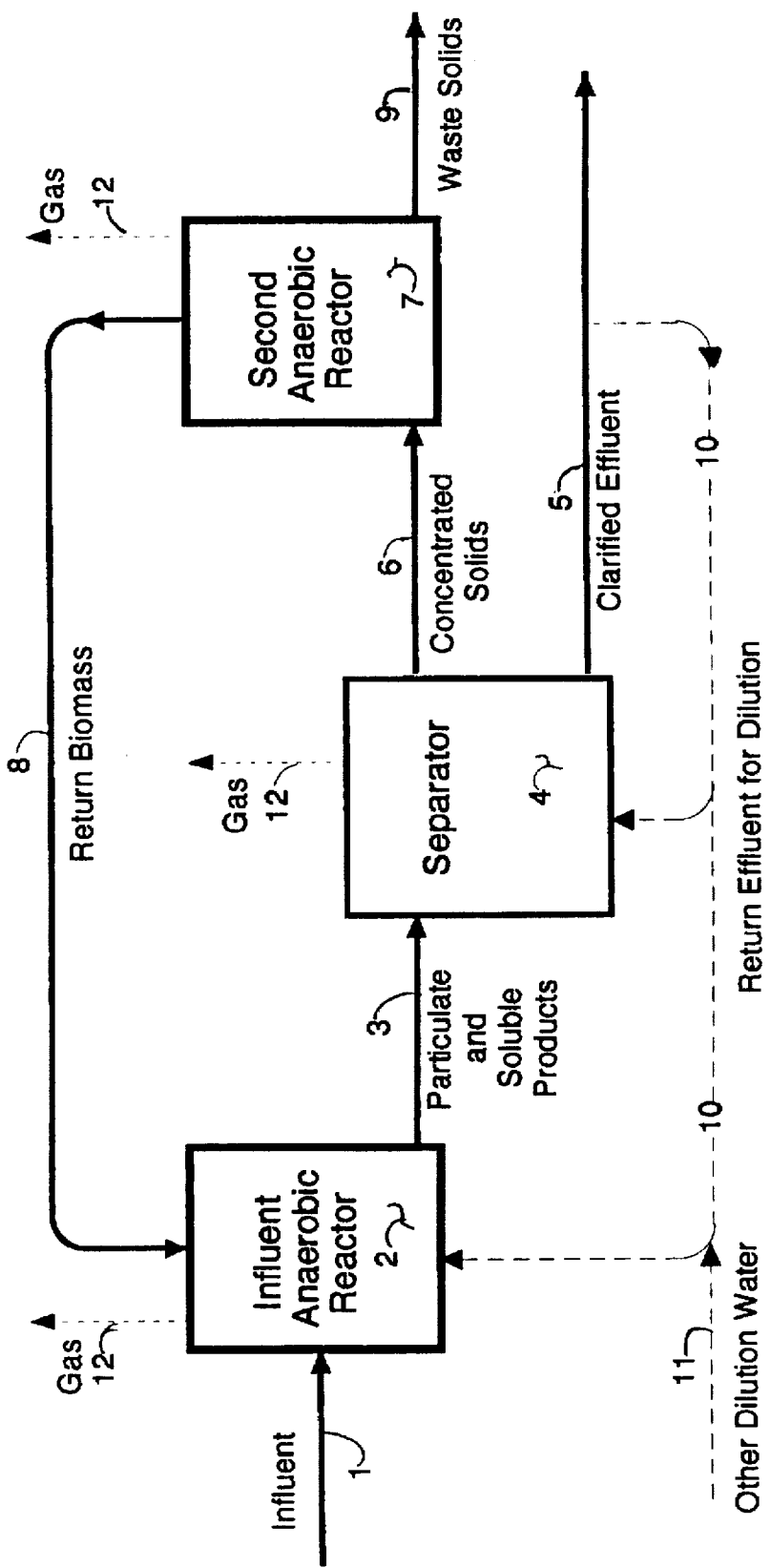
FIG. 1 is a schematic illustration of a preferred embodiment of an apparatus for carrying out the process of the present invention.

The present invention provides a process that takes advantage of the natural anaerobic digestive mechanisms to produce a clean effluent while minimizing the capital and operating cost of anaerobic treatment facilities through a reduction in reactor volume and total process retention time. The present invention also provides an apparatus as described below in more detail for carrying out the process.

The process achieves these functions by degrading a portion of the organic material in a first anaerobic reactor which is sized to provide a retention time suitable to rapidly convert the organic materials to soluble and gaseous components when contacted with a diverse and concentrated mass of hydrolyzing anaerobic bacteria, preferably from a second anaerobic reactor. In a preferred embodiment as described below in more detail, the first anaerobic or influent reactor is also sized to allow for elutriation or washing of soluble products from the anaerobic bacteria through contact with dilute influent stream or the addition of dilution water. By degrading a majority of the soluble and a portion of the particulate organic material in the first anaerobic reactor, the process is then able to concentrate the remaining organic material that has not been degraded and separate it from the soluble constituents for further treatment. This concentration/separation is accomplished in a separator that separates the suspended colloidal constituents and particulate constituents comprising colloidal and particulate unmetabolized solids, bacteria and inorganic precipitate products of digestion from the soluble components that comprise soluble inorganic solid products of digestion and soluble gas products of digestion. This separated stream of suspended colloidal constituents and particulate constituents is then directed to a second anaerobic reactor where they are contacted with anaerobic bacteria for further degradation as described below in more detail.

The goal of the first anaerobic reactor is to reduce the soluble constituents, or those constituents that cannot be removed by the separation device, to a level that meets the process effluent limitations and to remove particulate and colloidal constituents, or those constituents that can be removed by the separation device, to a level that benefits the separation economics and the economics of the second anaerobic reactor. There are two goals to be met by the first reactor. They are:

(1) Meet process effluent limitations by removing those constituents that cannot be removed by the separator. Once those constituents, assumed to be soluble, are removed, the separator can remove the remainder, thus the desired effluent limitations are met; and (2) Remove as much of the particulate and colloidal constituents as economically feasible to improve the economics of the separation device and the second anaerobic digester capacity.

These process parameters will often be dictated by economics. The cost of separation is dictated by the total quantity of solids processed. The total quantity of solids dictates the cost of chemicals, such as polymer and the cost of pressurizing gas if flotation is used. The separation process is economically enhanced by removing as much of the particulate constituents as possible in the first anaerobic reactor. On the other hand, the cost of removing the solids in the first reactor is based on the detention time of the reactor (increased solids reduction means increased volume and therefore costs) and the quantity of solids recycled from the second reactor. The quantity necessary to recycle from the second reactor dictates the size and cost of the second reactor. In certain situations, the preferred economic decision point will be where the easily hydrolyzed solids are removed in the first reactor, with the soluble constituents or nonparticulate constituents, and the slowly hydrolyzed solids are removed in the second reactor with the stored bacteria.

Referring to FIG. 1, a schematic illustration of an apparatus for carrying out an aerobic treatment process in accordance with the present invention is provided. The apparatus includes a first influent anaerobic reactor 2, a second anaerobic reactor 7, and a separator 4 intermediate the first anaerobic reactor and the second anaerobic reactor.

Influent organic material comprising soluble, colloidal, and suspended particulate constituents having varying hydrolysis rates is delivered to influent anaerobic reactor 2 via line 1. In a preferred embodiment, influent anaerobic reactor 2 also receives biomass, i.e., anaerobic bacteria, from second anaerobic reactor 7 through line 8. It should be understood that although recycle of anaerobic bacteria from second anaerobic reactor 7 is preferred, it is not required. For instance, the biomass introduced into influent anaerobic reactor 2 can originate from an independent source of anaerobic bacteria. By way of example, if influent stream one contains about 2,500 mg/L of chemical oxygen demand, e.g., COD, with approximately 90% particulate COD (PCOD) and it has been determined through pilot testing of the substrate that about 50% of the PCOD can be removed in about 4 hours with about a 10:1 biomass recycle from the second reactor, which maintains biomass at a concentration of about 50,000 mg/L in about a 60,000 mg/L solid slurry, then the ratio of biomass recycled to influent flow will be 0.5 or 50%. The concentration influent to the separation device will be about 20,916 mg/L which can be concentrated to about 62,000 mg/L for return to the second anaerobic reactor.

Influent anaerobic reactor 2 is sized so that a portion of particulate organic constituents are rapidly coverted to soluble and gaseous components when contracted with the anaerobic bacteria. As described above, the goal of the first anaerobic reactor is to reduce the soluble constituents, or those constituents that cannot be removed, by the separation device, to a level that meets the process effluent limitations and to remove particulate and colloidal constituents, or those constituents that can be removed by the separation device, to a level that benefits the separation economics and the economics of the second anaerobic reactor as discussed above.

In a preferred embodiment, influent reactor 2 is also sized to allow for elutriation or washing of soluble products from the anaerobic bacteria through contact with a dilute influent stream from separator 4 as described below in more detail or the addition of dilution water via line 11. The volume of elutriation water required shall be sufficient to maintain the concentration of the products of anaerobic decompositions such as ammonia or sulfides below inhibitory values for the anaerobic bacteria. If desired, effluent may also be returned via line 10 to provide alkalinity if required to maintained proper pH within influent anaerobic reactor 2.

In a preferred embodiment, influent reactor 2 is also sized to allow for elutriation or washing of soluble products from the anaerobic bacteria through contact with a dilute influent stream. If anoxic gas flotation is used to provide the separation, certain soluble constituents that contain hydrophobic structures such as organic acids, proteins, and enzymes will be separated from the particulate matter due to attachment to the gas bubble surface. Increased removal of such constituents can be accomplished by increasing the gas bubble surface area through utilization of fine gas bubbles or increasing gas/solids ratios. It is preferred to hydrolyze and degrade as much of the influent organic material in the influent reactor as economically feasible in order to reduce the volume of concentrated solids that are removed from separator 4 and delivered to second anaerobic reactor 7 as described below in more detail. The reduction in the volume of the solids introduced into second anaerobic reactor results in a commensurate decrease in the size of second anaerobic reactor 7. In a preferred embodiment, influent anaerobic reactor 2 has a retention time of less than about 12 hours, more preferably less than about 8 hours, and most preferably less than about 2 hours.

The amount of bacteria from second anaerobic reactor 7, that is contacted with the influent stream in influent anaerobic reactor 2, should be sufficient to promote hydrolysis of the more rapidly metabolized colloidal and particulate constituents as well as promote the consumption of substantially all of the soluble constituents. It is possible that some adsorption and flocculation of colloidal material with the anaerobic bacteria may also take place. Such adsorption is not expected to be high since anaerobic bacteria do not flocculate well or adsorb substantial quantities of organic substrate. The anaerobic bacteria stream from second anaerobic reactor 7 will also contain soluble products of digestion that will be diluted by the influent, thus reducing the concentration of soluble digestion products. As discussed above, dilution water may be added to dilute, or elutriate the products of digestion from the bacteria. In accordance with the present invention, under these enriched bacterial conditions, a portion of the organic material in the influent will be substantially degraded in a short period of time as described above.

The effluent from influent anaerobic reactor 2, containing colloidal and particulate solids that have not been metabolized, anaerobic bacteria, inorganic precipitates generated through bacterial decomposition of the organic substrates, and soluble inorganic products of digestion are transferred via line 3 to a mechanical separation device 4, such as a gas floatation separator or centrifuge. It should be understood that other types of mechanical separators or chemically induced separators or chemically aided separation techniques can be employed provided there is no adverse impact on the anaerobic bacteria. The particular separation technique used provides an effluent that meets process effluent discharge criteria. Accordingly, it is preferred that the separation technique remove substantially all the suspended colloidal and particulate constituents, bacteria and precipitates from the soluble constituents in the partially digested stream from anaerobic reactor 2. Separation aids or chemicals may be used to accomplish the required separation and clarification. If gas floatation separation is used, the bubbles should be anoxic gas microbubbles capable of producing a clarified effluent substantially free of suspended solids. A floatation separator may also use a recycled effluent solution, or diluted effluent solution for elutriation of the anaerobic bacteria in separator 4. In addition, the recycled effluent can be used to carry dissolved gas back to separator 4. Dilute effluent may also be added to other mechanical separation devices to promote the desired elutriation. Floatation separation, using microbubbles, such as those produced with dissolved gas floatation, may also be structured to promote the removal of surface active constituents, having hydrophobic characteristics, such as organic acids, proteins, and extracellular enzymes. The high bacteria to substrate ratio will cause a more rapid hydrolysis of slowly metabolized constituents.

In order to assess the relationship between the hydrolysis rates and biomass concentration, two identical anaerobic reactors were operated in parallel for six months. Both reactors were fed semicontinuously the same, 5% to 6% solids, primary and waste activated sewage sludge. The biomass was concentrated in one reactor by means of anoxic gas flotation (AGF). The biomass was assumed to be directly proportional to the volatile solids content of each reactor. The AGF reactor had a volatile solids content of 43,175 mg/L. The conventional reactor had an average volatile solids content of 15,952 mg/L. The ratio of volatile solids content for the reactors was 2.52 which was presumed to be the biomass ratio for the respective reactors. Gas production was measured continuously and analyzed for methane content throughout the day. Each reactor was fed an average of 6 kilograms of sewage sludge of which about 85% was particulate chemical oxygen demand (COD). Methane gas production was recorded and converted to equivalent COD production based on 350 L of methane gas equaling 1.0 Kg of COD. As illustrated in FIG. 2, the hydrolysis rates were calculated for each reactor based on accumulated gas production. The hydrolysis rates for the AGF were almost twice (1.92), the rate of the conventional reactor. A solids concentration or biomass ratio of 2.52 resulted in a hydrolysis ratio of 1.92. An approximate doubling of the biomass resulted in an approximate doubling of the hydrolysis rates for identical influent streams.

Nonchemically aided gravity sedimentation is a separation process that is not considered to be within the scope of separation techniques that have application in the context of the present invention. The inapplicability of nonchemically aided gravity sedimentation is a function of the inability of this type of separation technique to effectuate satisfactory separation between suspended colloidal and particulate constituents from soluble constituents in the effluent from influent anaerobic reactor 2. It is possible that sedimentation techniques that are aided or induced by chemicals may be suitable to remove substantially all of the suspended, colloidal and particulate material from the influent stream, and thus be useful in the context of the present invention.

Separator 4 produces a clarified effluent containing primarily inorganic dissolved solids and gases which is removed from separator 4 via line 5. The effluent from separator 4 can be discharged for further treatment to remove the dissolved solids and gases. The suspended, colloidal and particulate constituents, bacteria and inorganic precipitates separated from the soluble constituents are removed from separator 4 and delivered to the second anaerobic reactor 7 via line 6. While not intending to be limited to any particular solids content, the concentrated solids in line 6 preferably comprise about 4 to about 10 wt. % solids. This is in comparison to the influent in line 1 which has a significantly lower solids content. It is preferable to have the solids content of the material in line 6 as high as possible because the more concentrated the solid feed stream from separator 4, the smaller the second anaerobic reactor 7, provided the higher concentration of solids does not inhibit the anaerobic activity of the bacteria by limiting mixing and the release of gaseous products of digestion. The desired solids concentration from separator 6 can be calculated using known formula that relate influent inorganic solids concentration with the desired solids retention time and anaerobic digester concentration. The desired anaerobic digestion concentration is expected to be limited by mixing in dispersion considerations.

The concentrated solids from separator 7 comprise biomass, organic particulate and colloidal solids that have not been hydrolyzed, and inorganic precipitates, such as metal sulfides, struvite, phosphates, and other complex precipitates produced through bacterial decomposition. The organic particulate and colloidal constituents in line 6 are the more slowly hydrolyzed and degraded materials that composed the influent stream 1. Accordingly, they were not materially hydrolyzed or metabolized in influent reactor 2. These organic particulate and colloidal constituents are contacted with anaerobic bacteria in the second anaerobic reactor 7 for a period sufficient to hydrolyze and metabolize these constituents. The second anaerobic reactor is sized to promote this degradation of the slowly metabolized constituents with a high concentration of cultured bacteria. The high bacteria to substrate ratio will cause a more rapid hydrolysis of slowly metabolized constituents In addition, the second anaerobic reactor 7 is sized to provide a bacterial mass required for influent anaerobic reactor 2. By reducing the volume of influent to anaerobic reactor 7, its size is reduced a commensurate amount compared to the size that would be required if the soluble constituents were not separated in separator 4 but rather were passed through second anaerobic reactor 7.

Byproduct soluble gas is vented from second anaerobic reactor 7 through line 12, and waste solids are removed via line 9.

Wasting of solids from second anaerobic reactor 7 may occur in order to prevent the accumulation of inorganic precipitates. The quantity to be wasted will be a function of the influent inorganic solids content and the desired solids level to be maintained in the second anaerobic reactor. It is preferred to limit the quantity of solids to be wasted since the wasting will reduce the solids retention time or time available for hydrolysis of the very slow hydrolyzable constituents.

The concentration of biomass stored in second anaerobic reactor 7 will effect its hydraulic retention time. The hydraulic retention time of second anaerobic 7 will be dictated by the rate of decomposition of the slowly metabolized particulates as well as the mass of bacteria required to hydrolyze the influent substrate in first anaerobic reactor 2. Since the hydrolysis rate of the influent particulate constituents is a function of the bacterial mass contacting the substrate, the rate of outflow stream 8 from second anaerobic reactor 7 will be established by the influent hydrolysis requirements of first anaerobic reactor 2 and the concentration of biomass maintained in second anaerobic reactor 7. The detention time of second anaerobic reactor 7 will be established by the hydrolysis of the slowly metabolized particulates as well as the concentration of the products of anaerobic decomposition, such as ammonia and sulfides which may limit the detention time.

Unlike conventional anaerobic digestion process wherein hydraulic retention times average on the order of 20 days, the present process is able to be practiced with hydraulic retention times on the order of 5 days or less. The present applicant has observed that waste activated sludge and primary sewage sludge, which when treated by conventional anaerobic digestion processes is considered to have hydrolysis half lifes of 4 to 5 days. In contrast, hydrolysis half lifes on the order of about 1 day or less are achieved when waste is treated in accordance with the anaerobic digestion process of the present invention.

While the preferred embodiment of the invention has been illustrated and described, it will be appreciated that various changes can be made therein without departing from the spirit and scope of the invention. For instance, the first anaerobic reactor can comprise a fixed film reactor and the entire anaerobic digestion process can be supplemented by a carrier-assisted process using a synthetic substrate for the anaerobic bacteria.

The embodiments of the invention in which an exclusive property or privilege is claimed are defined as follows:

1. An anaerobic treatment process for the conversion of organic material to soluble and gaseous components comprising the steps:

contacting in a first anaerobic reactor, an influent stream containing the organic material with active anaerobic bacteria recycled from a second reactor;

maintaining the organic material in contact with the anaerobic bacteria for a predetermined period to partially digest the organic material;

mechanically or chemically separating suspended colloidal constituents and particulate constituents from the partially digested influent stream; and delivering the separated suspended colloidal constituents and particulate constituents to the second anaerobic reactor for further digestion of organic material.

2. The process of claim 1, wherein the organic material of the influent stream comprises soluble, colloidal, and particulate constituents, the maintaining step reducing the level of soluble constituents, and other constituents that cannot be removed in the separating step to a level that meets process effluent requirements.

3. The process of claim 1, wherein the predetermined period is less than about 12 hours.

4. The process of claim 1, wherein the mechanical or chemical separation is selected from the group of separation techniques consisting of chemically induced sedimentation, flotation, and centrifugation.

5. The process of claim 4, wherein the flotation separation technique comprises gas flotation.

6. The process of claim 1, wherein the influent stream comprises soluble, colloidal, and particulate constituents having differing hydrolysis rates, a portion of the colloidal and particulate constituents being substantially hydrolyzed after the predetermined period.

7. The process of claim 6, wherein the soluble constituents are substantially metabolized in the predetermined period.

8. The process of claim 1, wherein the solids content of the separated stream of suspended colloidal constituents and particulate constituents is about 4 to 12 weight percent.

9. The process of claim 1, wherein the predetermined period is less than about 8 hours.

10. The process of claim 1, wherein substantially all of the suspended colloidal constituents and particulate constituents are separated from the partially digested influent stream.

11. The process of claim 1, further comprising a step of elutriating soluble products of digestion from the particulate constituents.

12. The process of claim 1, wherein the contact between the influent stream and the anaerobic bacteria is carried out in a fixed film reactor.

13. The process of claim 1, wherein the contacting of the influent stream with the anaerobic bacteria is carried out using a carrier-assisted process.

* * * * *

UNITED STATES PATENT AND TRADEMARK OFFICE
CERTIFICATE OF CORRECTION

Page 1 of 3

PATENT NO. : 5,670,047
DATED : September 23, 1997
INVENTOR(S) : D.A. Burke

It is certified that error appears in the above-indentified patent and that said Letters Patent is hereby corrected as shown below:

| COLUMN | LINE | |
|---|---|---|
| 2 | 46 | After "flotation" insert --or centrifuge-- |
| 2 | 53 | After "degraded" insert --materials-- |
| 3 | 5 | "particular" should read --particulate-- |
| 3 | 17 | "floation" should read --flotation-- |
| 4 | 53 | "aerobic" should read --anaerobic-- |
| 5 | 2 | "stream one" should read --stream 1-- |
| 5 | 3 | Delete ", e.g.," and insert parentheticals around "COD" |
| 5 | 15 | Delete "rapidly" |
| 5 | 35 | "maintained" should read --maintain-- |

UNITED STATES PATENT AND TRADEMARK OFFICE
CERTIFICATE OF CORRECTION

Page 2 of 3

PATENT NO. : 5,670,047
DATED : September 23, 1997
INVENTOR(S) : D.A. Burke

It is certified that error appears in the above-indentified patent and that said Letters Patent is hereby corrected as shown below:

| COLUMN | LINE | |
|---|---|---|
| 5 | 40-47 | Delete the following sentences: "If anoxic gas flotation is used to provide the separation, certain soluble constituents that contain hydrophobic structures such as organic acids, proteins, and enzymes will be separated from the particulate matter due to attachment to the gas bubble surface. Increased removal of such constituents can be accomplished by increasing the gas bubble surface area through utilization of fine gas bubbles or increasing gas/solids ratios." |
| 5 | 59 | After "7" delete "," |
| 6 | 18 | After "separator" insert --, membrane separator-- |
| 6 | 21 | Delete "no" and insert --little-- |
| 6 | 43-45 | Delete the following sentence: "The high bacteria to substrate ratio will cause a more rapid hydrolysis of slowly metabolized constituents." and insert it at the beginning of the next paragraph beginning on line 47. |
| 7 | 14 | After "reactor 2" insert --primarily at high concentrations-- |
| 7 | 38 | Delete "6" and insert therefor --4, line 6-- |

UNITED STATES PATENT AND TRADEMARK OFFICE
CERTIFICATE OF CORRECTION

PATENT NO. : 5,670,047
DATED : September 23, 1997
INVENTOR(S) : D.A. Burke

It is certified that error appears in the above-indentified patent and that said Letters Patent is hereby corrected as shown below:

| COLUMN | LINE | |
|---|---|---|
| 7 | 39 | "formula" should read --formulae-- |
| 7 | 39 | Delete "inorganic" and insert therefor --organic-- |
| 7 | 44 | Delete "7" and insert therefor --4-- |
| 7 | 46 | After "been" insert --completely-- |
| 7 | 60 | After "constituents" insert --.-- |
| 8 | 36 | After "processes" insert --,-- |
| 8 | 45 | After the second occurrence of "reactor" insert --if the solids content is very low-- |

Signed and Sealed this

Fourteenth Day of July, 1998

*Attest:*

*Attesting Officer*

BRUCE LEHMAN
*Commissioner of Patents and Trademarks*

REEXAMINATION CERTIFICATE (3873rd)

United States Patent [19]
Burke

[11] B1 5,670,047
[45] Certificate Issued Sep. 7, 1999

[54] ANAEROBIC TREATMENT PROCESS FOR THE RAPID HYDROLYSIS AND CONVERSION OF ORGANIC MATERIALS TO SOLUBLE AND GASEOUS COMPONENTS

[76] Inventor: Dennis A. Burke, 6007 Hill Rd. NE., Olympia, Wash. 98516

Reexamination Request:
No. 90/004,914, Feb. 9, 1998

Reexamination Certificate for:
Patent No.: 5,670,047
Issued: Sep. 23, 1997
Appl. No.: 08/632,022
Filed: Apr. 15, 1996

Certificate of Correction issued Jul. 14, 1998.

[51] Int. Cl.⁶ ..................................................... C02F 3/28
[52] U.S. Cl. ........................... 210/603; 210/613; 210/614; 210/615; 210/617; 210/631
[58] Field of Search .................................. 210/603, 613, 210/614, 615, 617, 631

[56] References Cited

U.S. PATENT DOCUMENTS

| | | |
|---|---|---|
| 2,777,815 | 1/1957 | Forrest . |
| 2,786,025 | 3/1957 | Lamb . |
| 4,318,993 | 3/1982 | Ghosh et al. . |
| 4,401,565 | 8/1983 | Schimel ................................. 210/258 |
| 4,551,250 | 11/1985 | Morper et al. . |
| 4,559,142 | 12/1985 | Morper . |
| 5,015,384 | 5/1991 | Burke . |
| 5,525,228 | 6/1996 | Dague et al. . |

FOREIGN PATENT DOCUMENTS

WO9424056  10/1994  WIPO .

*Primary Examiner*—Jay H. Woo

[57] ABSTRACT

An anaerobic digestion process capable of converting organic slurries to precipitates, as well as soluble and gaseous products through a series of reactors or process steps. The organic material is processed through three sequential steps consisting of two anaerobic digestion steps and an intermediate liquid/solid separation step. The sequential steps consist of first degrading rapidly metabolized soluble and particulate constituents, contained in the influent, by mixing the influent to the first reactor with an effluent from a second reactor containing a high concentration of active biomass. Effluent from the first reactor is treated in a second step wherein the soluble and particulate components are mechanically separated from an effluent stream essentially free of particulate material but containing soluble products of digestion. The particulate stream is transferred to the second anaerobic reactor wherein the solely degrading materials are converted to soluble and gaseous products of digestion as well as precipitates.

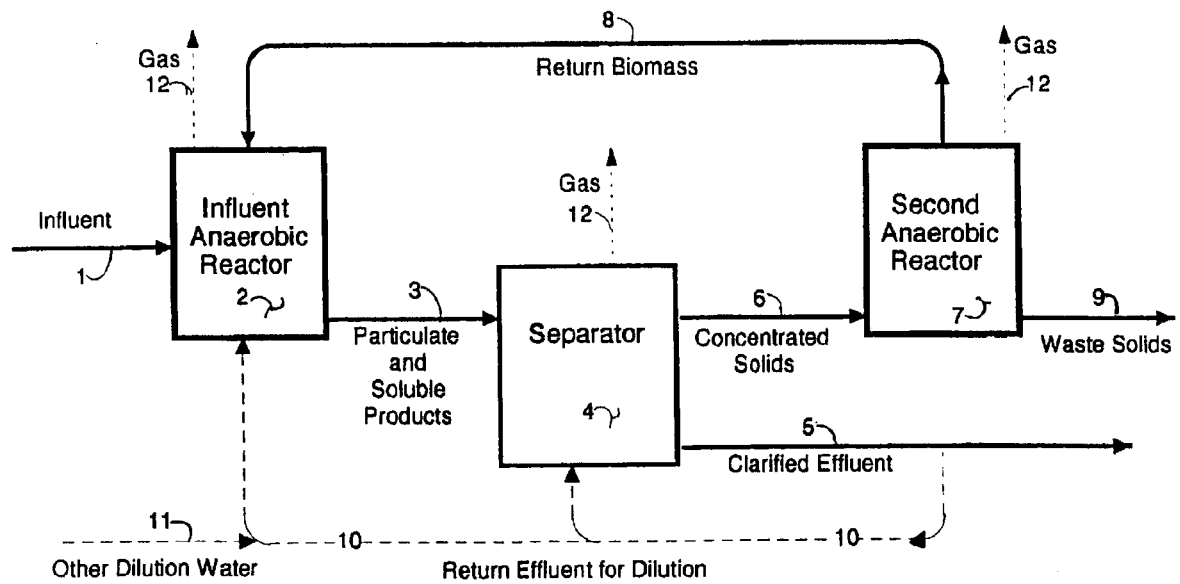

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is cancelled.

Claim 1 is determined to be patentable as amended.

Claims 2–10, 12 and 13, dependent on an amended claim, are determined to be patentable.

1. An anaerobic treatment process for the conversion of organic material to soluble and gaseous components comprising the steps:

contacting in a first anaerobic reactor, an influent stream containing the organic material with active anaerobic bacteria recycled from a second reactor;

maintaining the organic material in contact with the anaerobic bacteria for a predetermined period to partially digest the organic material;

mechanically or chemically separating suspended colloidal constituents and particulate constituents from the partially digested influent stream; [and]

delivering the separated suspended colloidal constituents and particulate constituents to the second anaerobic reactor for further digestion of organic material; and

[elutriating] *employing a dilute influent stream or water to elutriate* soluble products of digestion *that inhibit the activity of the anaerobic bacteria* from the particulate constituents.

* * * * *